United States Patent [19]

Hoashi et al.

[11] Patent Number: 4,825,371
[45] Date of Patent: Apr. 25, 1989

[54] ANTI-SKID CONTROL SYSTEM FOR MOTOR VEHICLE

[75] Inventors: Akira Hoashi, Kawasaki; Hideo Akima, Yokohama; Katsuya Miyake, Ageo; Isao Yamaki, Iwatsuki, all of Japan

[73] Assignee: Fujitsu Limited, Kawasaki, Japan

[21] Appl. No.: 28,544

[22] Filed: Mar. 20, 1987

[30] Foreign Application Priority Data

Mar. 20, 1986 [JP] Japan ................... 61-062433

[51] Int. Cl.$^4$ .............................................. B60T 8/34
[52] U.S. Cl. ................... 364/426.02; 303/97; 303/106; 180/197
[58] Field of Search ............... 364/426, 565; 180/197; 303/94–96, 102, 103, 105, 109, 110, 113

[56] References Cited

U.S. PATENT DOCUMENTS

| 4,637,663 | 1/1987 | Matsuda | 364/426 |
| 4,662,686 | 5/1987 | Matsuda | 364/426 |
| 4,717,209 | 1/1988 | Hagiya et al. | 303/110 |
| 4,741,580 | 5/1988 | Matsubara et al. | 303/105 |

FOREIGN PATENT DOCUMENTS 1305430 1/1973 United Kingdom .

Primary Examiner—Gary Chin
Attorney, Agent, or Firm—Staas & Halsey

[57] ABSTRACT

An anti-skid control system for a motor vehicle, includes a brake fluid pressure buildup-control mode and a brake fluid pressure reduction mode, each of which occur cyclically. In each buildup-control mode, a control valve is repetitively opened and closed so that brake fluid pressure buildup and holding operations are performed alternately. The time period of each buildup-control mode is from a high peak of a wheel speed signal until a point of intersection between a reference velocity $V_{W0}$ and the wheel speed $V_W$. The reference velocity $V_{W0}$ has an initial point Q positioned under the high peak $V_{HP}$ of the wheel speed $V_W$ by a velocity value $\Delta V$ and extending straight at a gradient $\theta$. The speed value $\Delta V$, the gradient $\theta$, and an initial pressure buildup time $T_P$, in each building-control mode, are determined in accordance with the wheel acceleration in the preceding wheel acceleration, i.e., coefficient of friction of the road surface.

8 Claims, 7 Drawing Sheets

ANTI-SKID CONTROL SYSTEM FOR MOTOR VEHICLE

CROSS-REFERENCE TO RELATED APPLICATIONS

This application is related to U.S. application Ser. No. 890,611 filed July 30, 1986, now U.S. Pat. No. 4,741,580 and assigned to the common assignees herein, that application furthermore claiming priority to Japanese patent application No. 60-170913 filed Aug. 2, 1985 and Japanese patent application No. 60-292997 filed Dec. 27, 1985, the Application No. 60-170913 moreover having been withdrawn in exchange and benefit for Japanese patent application No. 61-181350 filed Aug. 1, 1986 and claiming the priority date of the Application No. 60-170913. This application also is related to U.S. Ser. No. 028,674 and No. 028,543, both filed on Mar. 20, 1987 to the common assignees herein.

BACKGROUND OF THE INVENTION

1. Field of the Invention

This invention relates to an anti-skid control system for achieving a satisfactory rotational behavior of the wheels of a motor vehicle during a braking operation. More particularly, this invention pertains to an anti-skid control system which is designed to increase and reduce brake fluid pressure in a desirable manner to prevent the wheels from becoming locked.

Furthermore, the present invention is also directed to an anti-skid control system capable of preventing wheel locking, which tends to occur when the motor vehicle is running on a road surface with a very low coefficient of friction.

2. Description of the Related Art

There have been heretofore proposed a variety of anti-skid control systems wherein, during a braking operation, the brake fluid pressure is reduced to prevent the occurrence of an undesirable wheel lock, and the brake fluid pressure thus reduced is then increased to avoid an undesirable extension of the brake stopping distance. Among such conventional anti-skid control systems is one wherein different pressure buildup rates are stored; a desired one of the stored pressure buildup rates is selected; and brake fluid pressure is increased with the selected buildup rate, for example. To effect the pressure buildup rate selection, a system has been proposed, wherein a solenoid-operated valve adapted to be opened and closed with a relatively high frequency is provided in the brake fluid pressure buildup system; a pulse train generator such as a multivibrator is provided in the drive system for the solenoid-operated valve; and the timing with which the solenoid-operated valve is driven by a pulse train signal derived from the multivibrator is controlled on the basis of a signal representing wheel acceleration (British patent specification No. 1305430).

Nevertheless, a more satisfactory anti-skid control is difficult to achieve with the aforementioned conventional system wherein the anti-skid control operation is performed by the opening and closing of a solenoid-operated valve which is driven by a pulse train signal either with a single average pressure buildup rate or a rate selected from several different pressure buildup rates. This will be explained in the following discussion. The decrease and recovery of the wheel speed requiring anti-skid control is influenced by various factors, such as the conditions of the road surface on which the motor vehicle is running, the coefficient of friction of the road surface, the vehicle running speed, the brake operating condition, the tire surface condition, the internal pressure of the tire tube, and so forth, and the overall effect of these factors is constantly and successively changing. The above-described conventional systems, however, fail to respond quickly enough to cope with such a situation, and this difficulty becomes most remarkable with the brake fluid pressure buildup mode for an anti-skid control which requires a delicate balance between two contradictory requirements, i.e., a requirement to restrain a re-locking of a wheel as effectively as possible and a requirement to prevent an undesirable extension of the brake stopping distance.

SUMMARY OF THE INVENTION

Accordingly, an object of the present invention is to provide an anti-skid control system, in which the reduced brake fluid pressure can be increased quickly in response to the actual rotational behavior of a wheel on a motor vehicle.

Another object of the present invention is to provide an inexpensive and highly reliable anti-skid control system in which a buildup of the brake fluid pressure is quickly achieved in response to the rotational behavior of a wheel, especially with regard to the coefficient of friction of the road surface.

According to the present invention, there is provided an anti-skid control system for a motor vehicle, which system includes a brake fluid pressure buildup-control mode and a brake fluid pressure reduction mode, each of which occurs cyclically and wherein, during each buildup-control mode, a valve means is repetitively opened and closed so that the brake fluid pressure buildup and holding operations are performed alternately. The system includes a means for measuring a speed $V_W$ of each wheel of the motor vehicle, a means for determining a high peak point $V_{HP}$ and low peak point $V_{LP}$ of the wheel speed when this anti-skid control system is operated and a means for repetitively opening and closing the valve means during a time of each buildup-control mode, from the high peak point $V_{HP}$ of the wheel speed until a point of intersection R between a reference velocity $V_{W0}$ and the wheel speed $V_W$. The reference velocity $V_{W0}$ has an initial point Q positioned under the high peak $V_{HP}$ of the wheel speed $V_W$ by a predetermined velocity value $\Delta V$ and extends in a straight line at a gradient $\theta$ to intersection R.

The present invention also provides a means for measuring the wheel acceleration, on the basis of the wheel speed $V_W$, during a time between a first point Va and a second point Vb. The first point Va is increased by a predetermined rate of wheel speed from the low peak point of the wheel speed $V_{LP}$. The second point Vb is further increased by a predetermined rate from the first point Va. A means for determining at least one of the speed value $\Delta V$, the gradient $\theta$, and an initial pressure buildup time $T_P$, in each buildup-control mode, in accordance with the wheel acceleration is also provided.

In order to perform the braking operation from the high peak point $V_{HP}$ of the wheel speed $V_W$ until the time when the reference velocity $V_{W0}$ intersects with the wheel speed $V_W$, the velocity value $\Delta V$, the gradient $\theta$, and the initial pressure buildup time $T_P$ are selected in accordance with the acceleration of the wheel measured between two points Va and Vb in the acceleration period of a preceding skid-cycle. This selection of ΔV, θ, and $T_P$ is repeated in each skid-cycle and, therefore, the most appropriate anti-skid control is performed on the basis of a coefficient of friction $\mu$ between the tire surface and the road surface on which the motor vehicle is running. Particularly, even if the conditions of the road surface, such as the coefficient of friction, are changed during a braking operation, a wheel lock due to an excess braking pressure and/or an unnecessary extension of the braking distance due to a lack of braking pressure are both prevented, so that a stable operation of the motor vehicle is attained, since the vehicle can be stopped within a minimum braking distance.

DESCRIPTION OF THE PREFERRED EMBODIMENTS

Figure 1:
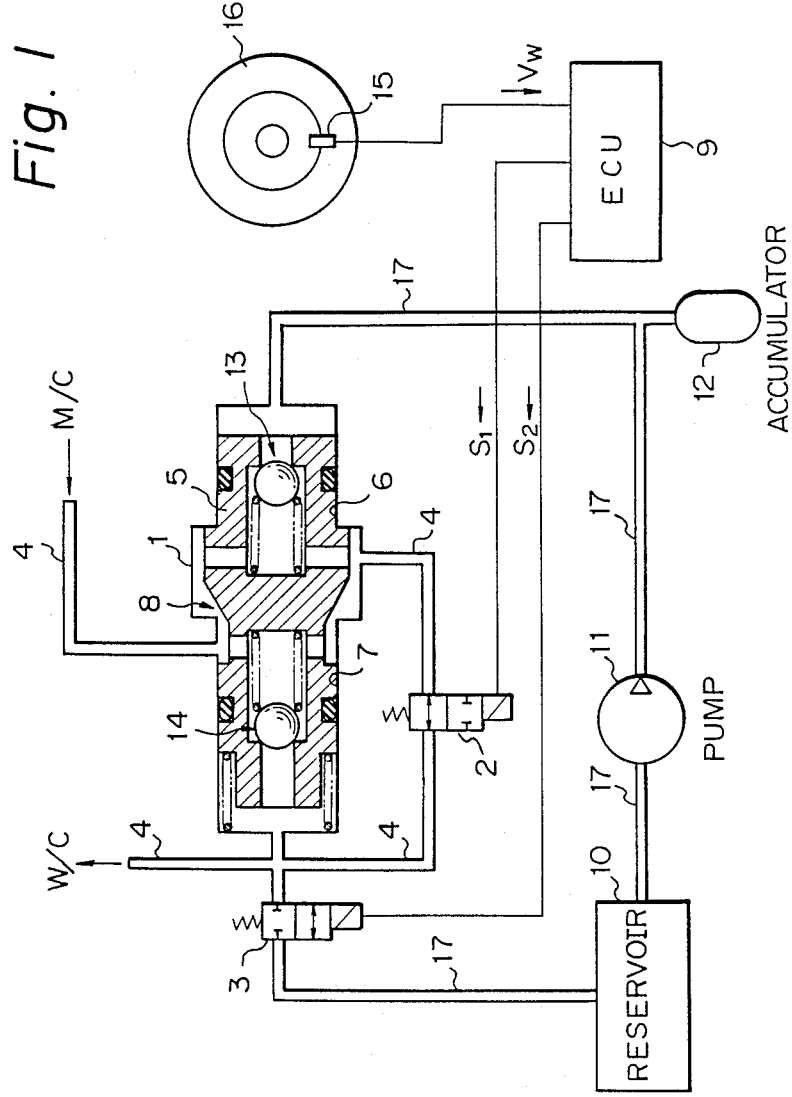
FIG. 1 is a schematic diagram of an anti-skid control apparatus to which the present invention is applicable.

FIG. 1 illustrates an anti-skid control apparatus to which the present invention is applicable, which includes a gate valve 1, a pressure buildup-holding solenoid-operated valve (referred to simply as first valve hereinafter) 2, a pressure-reducing solenoid-operated valve (referred to simply as second valve hereinafter) 3, a main fluid passage 4 extending from a master cylinder M/C (not shown) to wheel cylinders W/C of wheel brake devices (not shown) through the gate valve 1 and first valve 2, and so forth.

The gate valve 1 includes cylinders 6 and 7 containing a differential pressure-responsive piston 5 which is arranged to close a valve portion 8 of the gate when the piston 5 is displaced to the left in the drawing due to a pressure difference. Upon closure of the valve portion 8, the main passage 4 extending between the master cylinder M/C and the wheel cylinder W/C is interrupted.

The first valve 2, which is normally open, is closed in response to a brake fluid pressure holding signal $S_1$ derived from a control circuit 9, and thereupon, the main passage 4 is interrupted so that a brake fluid pressure holding condition is established.

The second valve 3, which is normally closed, is opened in response to a pressure-reducing signal $S_2$ also derived from the control circuit 9, and thereupon, pressure fluid in the wheel cylinder W/C is pumped into an accumulator 12 by means of a pump 11 through a reservoir 10 and the thus pumped pressure fluid is returned between the gate valve 1 and the first valve 2 through a by-pass passage 17. Indicated at 13 and 14 are a check valve and relief valve, respectively.

A wheel velocity detector or speed sensor 15 is associated with a wheel 16 and arranged to provide detected information to the control circuit 9.

A motor vehicle is usually provided with two such anti-skid control apparatuses as shown in FIG. 1; one for controlling two wheels, such as front left and rear right wheels, and the other for controlling the remaining two wheels, such as front right and rear left wheels.

Figure 2:
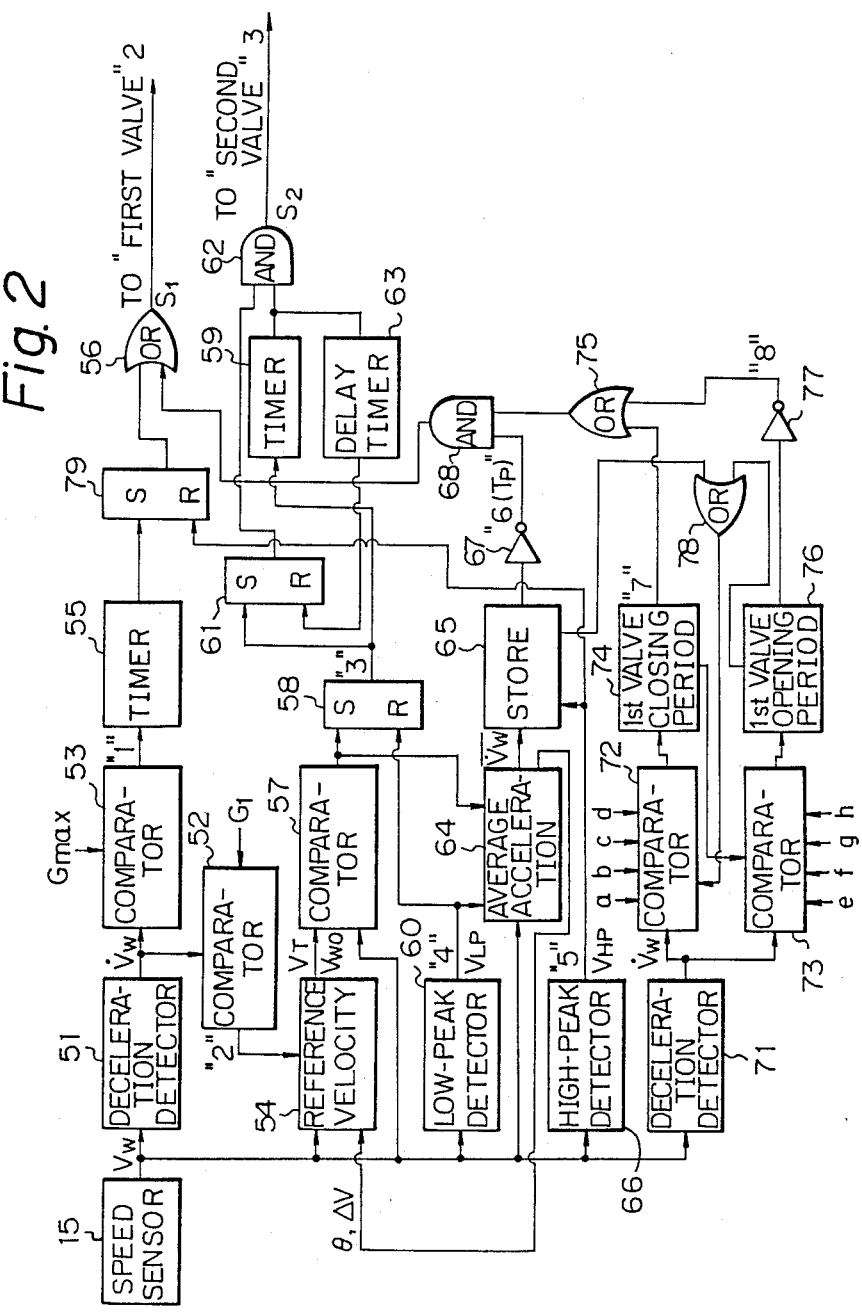
FIG. 2 is a block diagram of a control circuit according to an embodiment of the present invention, which is usable with the apparatus of FIG. 1.
Figure 3:
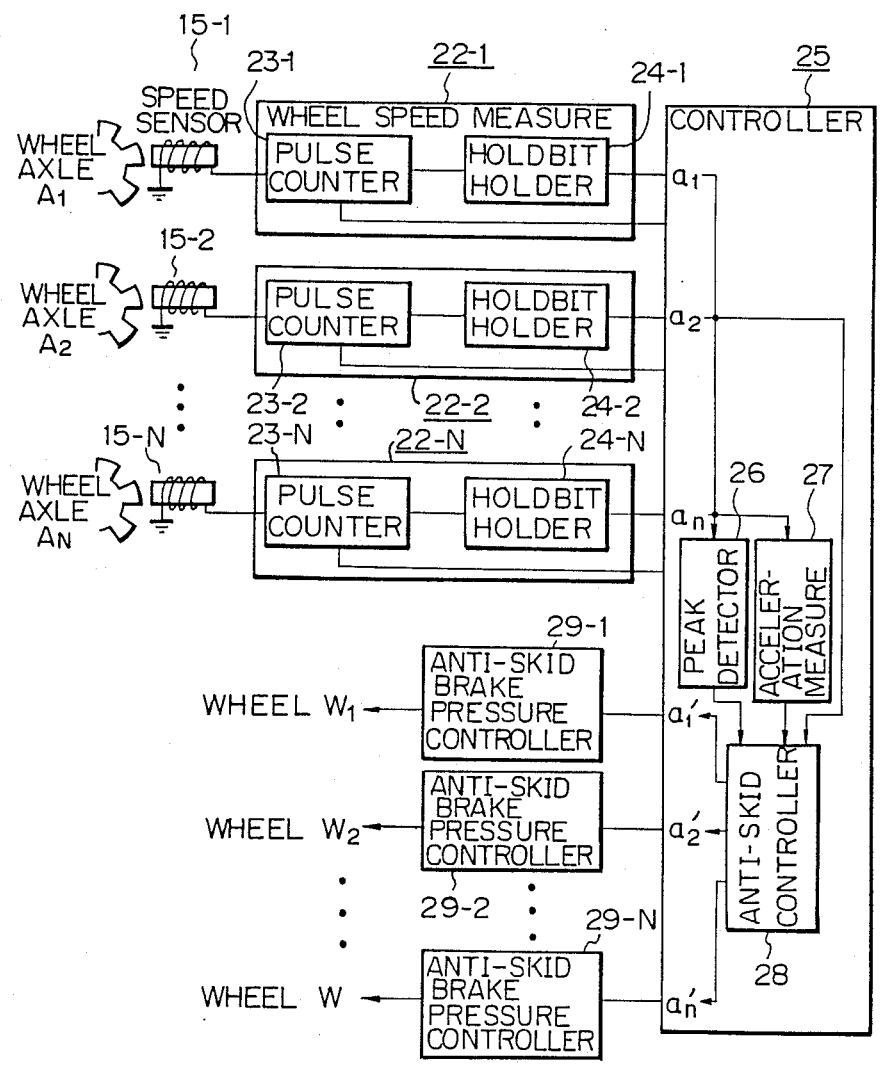
FIG. 3 is a schematic block diagram of the control circuit which is usable with the apparatus of FIG. 1.
Figure 4:
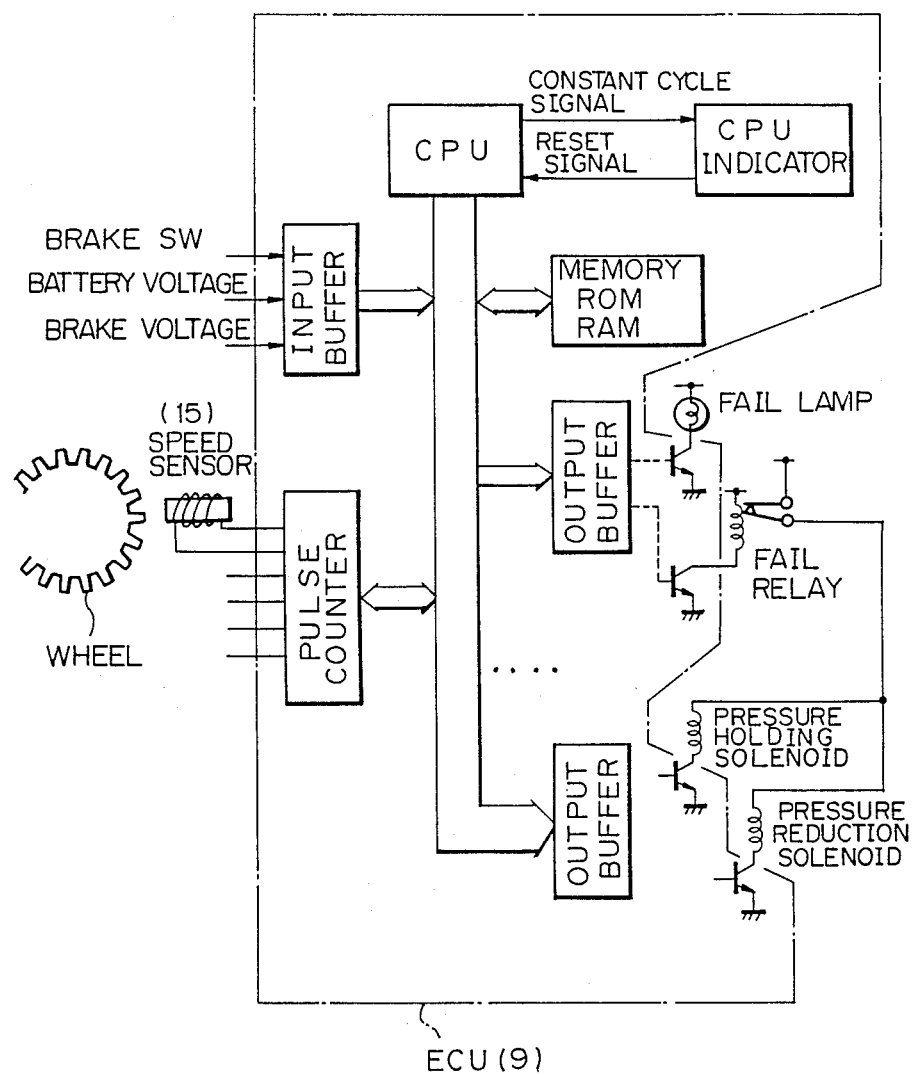
FIG. 4 is also a schematic block diagram of the control circuit which is usable with the apparatus of FIG. 1.

The control circuit 9 comprises a microcomputer which is equipped with such functions as shown in the block diagrams of FIGS. 2, 3, and 4.

In FIGS. 3 and 4, the wheel speed sensors 15-1 to 15-N generate pulse signals corresponding to a revolutional speed of wheel axles $A_1$ to $A_N$, respectively. Each sensor 15 generates 100 pulses, for example, for one revolution of the wheel.

Wheel speed measuring units 22-1 to 22-N measure the cycles of the pulse signals output from the speed sensors 15-1 to 15-N, respectively, and calculate the wheel speeds of the respective wheels. Each of the pulse cycle counting circuits 23-1 to 23-N counts clock pulses during the time from one pulse signal of sensor 15 until the next pulse signal, to measure the wheel speed. Each of the holding counting circuits 24-1 to 24-N indicates that the pulse cycle counting circuits 23-1 to 23-N have completed the measurement of the wheel speed.

A peak detecting means 26 in a controller 25 detects high peak points and low peak points of the wheel speed measured by the wheel speed measuring units 22-1 to 22-N, and an acceleration measuring means 27 measures an acceleration of the wheel speed corresponding to the coefficient of friction $\mu$ between the tire surface and the road surface on which the vehicle is running. The acceleration is determined during the time between two points of the wheel speed by a predetermined value from a low peak detected by the peak detecting means 26.

An anti-skid brake control means 28 starts to supply a pressure buildup signal at a high peak point until a point of intersection between the wheel speed $V_W$ and a predetermined reference velocity $V_{W_0}$, which is set in every skid-cycle so as to perform the most effective anti-skid brake control.

The operation of the anti-skid control system of this invention will now be explained with reference to FIGS. 5 and 6.

Figure 5:
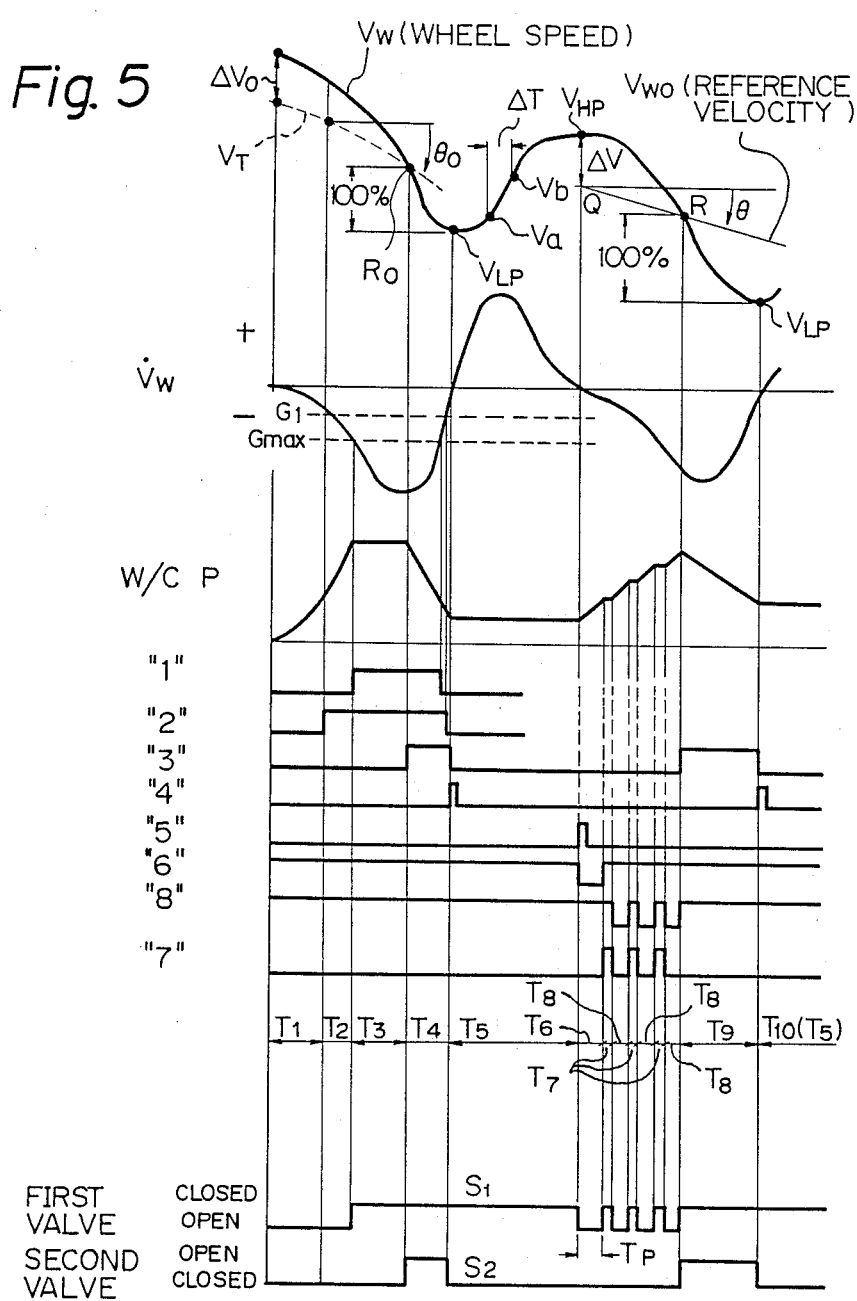
FIG. 5 is a view for explaining the operation of the circuit shown in FIG. 2.
Figure 6:
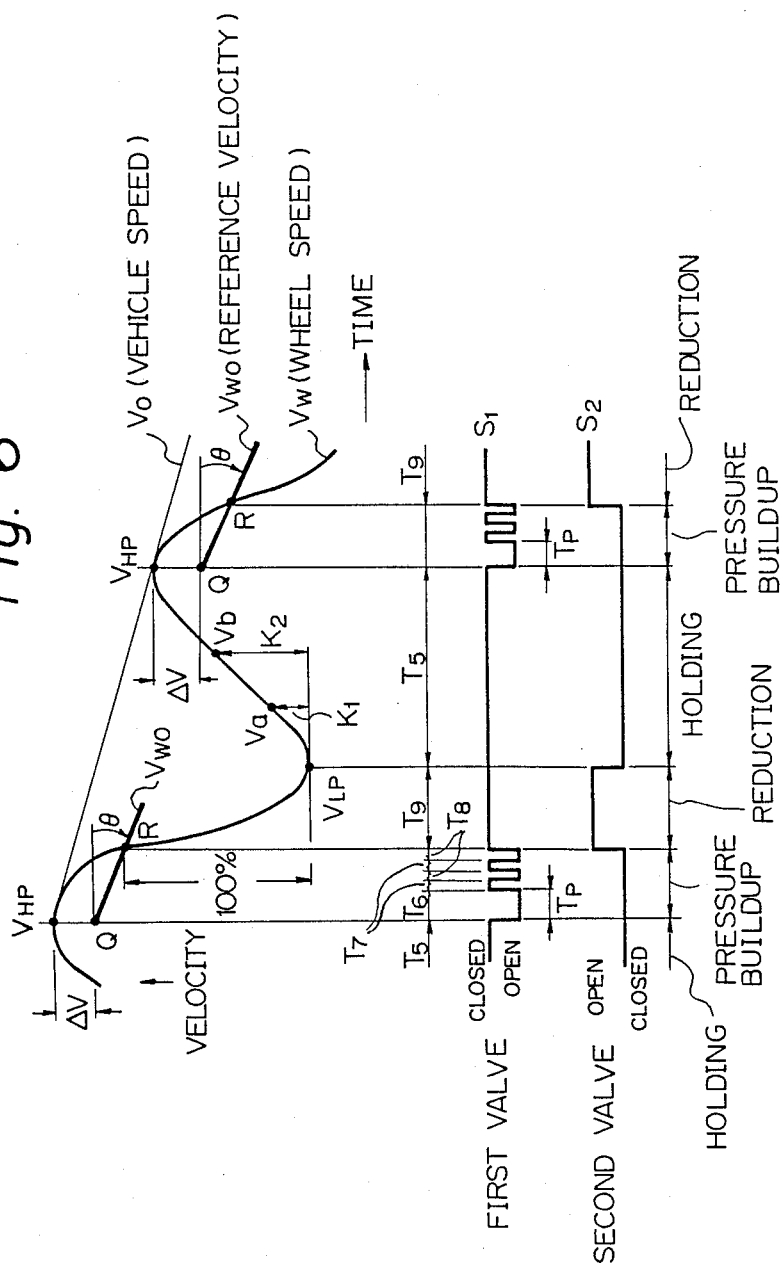
FIG. 6 is a view for explaining an embodiment of the present invention.

FIG. 5 shows the wheel speed $V_W$, wheel deceleration $\dot{V}_W$, brake fluid pressure within the wheel cylinder W/C of the brake system, signals "1" to "8" which occur in the circuit of FIG. 2, and the opening and closing timing of the first and second valves 2 and 3.

Typically, during times $T_1$ to $T_9$ shown in FIG. 5, the below-described control operations are performed by the control circuit of FIG. 2 in accordance with variations in the wheel speed $V_W$ detected by the speed sensor 15 shown in FIGS. 1 to 4. The wheel deceleration $\dot{V}_W$ is determined in a wheel deceleration determining unit 51 (FIG. 2) on the basis of the wheel speed $V_W$. The wheel deceleration $\dot{V}_W$ thus determined is then compared with a preset threshold level $G_1$ in a first comparator 52, and with another preset threshold level $G_{max}$ in a second comparator 53.

Time $T_1$: When braking operation is started, the brake fluid pressure P builds up so that the wheel deceleration $\dot{V}_W$ increases gradually. Reference velocity $V_T$, which will be described below, varies in accordance with the wheel speed $V_W$ by a speed difference equal to a predetermined value $\Delta V_0$ maintained therebetween.

The reference velocity $V_T$ is determined, based on the wheel speed $V_W$, in a reference velocity determination unit 54 (FIG. 2) which is controlled based on the output of the first comparator 52 in such a manner that the reduction rate of the reference velocity $V_T$ does not exceed a predetermined value $\theta_0$ which corresponds to the threshold level $G_1$.

Time $T_2$: When the wheel deceleration $\dot{V}_W$ reaches the threshold level $G_1$, an output signal "2" is derived from the first comparator 52, and the reference velocity $V_T$ decreases with the constant gradient $\theta_0$.

Time $T_3$: As the wheel deceleration $\dot{V}_W$ further increases, it reaches the threshold level $G_{max}$, and thereupon, the second comparator 53 provides an output signal "1" which in turn is passed through a first timer 55 to set a third flip-flop 79, which provides a signal through a first OR gate 56 to close the first valve 2.

The threshold level $G_{max}$ is preset to prevent a further buildup of the brake fluid pressure P when the wheel deceleration $\dot{V}_W$ increases beyond this threshold level.

At the beginning of the time $T_3$, the master cylinder M/C is isolated from the wheel cylinder W/C so that the brake fluid pressure P prevailing within the wheel cylinder W/C is held. If $G_{max}$ is not detected even when a preset time has elapsed after the time when the signal "1" appeared, the timer 55 (FIG. 2) operates to block the signal "1".

Time $T_4$: When the wheel speed $V_W$ and reference velocity $V_T$ become equal to each other at $R_O$ the first flip-flop 58 is set and provides an output signal "3" which in turn is passed through a second timer 59 and a first AND gate 62 to cause the second valve 3 to be opened so that the brake fluid pressure P within the wheel cylinder W/C is reduced.

If the output signal "3" still exists when a preset time has elapsed after the time when this signal appeared, the second timer 59 operates to block the signal "3", thus causing the second valve 3 to be closed. In this way, the pressure reduction is prevented from continuing for longer than necessary.

A second flip-flop 61 is set by the signal "3". The output signal of the second flip-flop 61 is provided to the second valve 3 through the first AND circuit 62. The flip-flop 61 is arranged to be reset, when a preset time has elapsed from the time when the first valve 2 was closed, by the output of a delay timer 63 which enables a start of the operation thereof by the output signal "3". With this arrangement, the anti-skid control system can be returned to the initial condition. This operation is based on a fail-safe concept. The time preset in the delay timer 63 is selected to be sufficiently larger than one control cycle (the period from the time when a pressure reduction occurs to the next time when a pressure reduction occurs again).

Time $T_5$: When the wheel speed $V_W$ reaches a low peak $V_{LP}$, then a low peak detector 60 provides an output signal "4", which in turn is passed to reset the first flip-flop 58. Consequently, the output signal "3" disappears, and thus the second valve 3 is closed.

As a consequence of the above-described operations, the brake fluid pressure P within the wheel cylinder W/C is held ($T_3$) reduced ($T_4$), and again held ($T_5$), and the pressure holding operation performed during the time $T_5$ is continued until a high peak of the wheel speed $V_W$ is detected, as will be described below. Thus, the braking forces are reduced so that the wheel speed $V_W$ is sufficiently recovered.

According to this invention, the average acceleration $\overline{V}_W$ (not shown) of the wheel speed $V_W$ as the latter is increasing, is sought during the time $T_5$. The length of a next time $T_6$ ($T_P$) during which the first value 2 is open, is determined based on the value of the average acceleration. According to the present invention, a gradient $\theta$ and a velocity value $\Delta V$, as will be mentioned below, are also determined based on the value of the average acceleration $\overline{V}_W$.

More specifically, in an average acceleration computing circuit 64 shown in FIG. 2, a wheel speed $R_0$ at the time when a pressure reduction is initiated (the beginning of the time $T_4$) and a wheel speed $V_{LP}$ at the time when a low peak occurs (the beginning of the time $T_5$) are sought on the basis of the wheel speed $V_W$ derived from the speed sensor 15, the output signal "4" of the low peak detector 60, and the output of the comparator 57. Computation is also effected to seek the wheel speeds Va and Vb, which will be explained below, in accordance with the following equations:

$$Va = K_1(R_0 - V_{LP}) + V_{LP} \quad (1)$$

$$Vb = K_2(R_0 - V_{LP}) + V_{LP} \quad (2)$$

where $0 < K_1 < K_2 < 1$

Assuming that A represents the difference $(R_0 - V_{LP})$, the wheel speed Va is higher than the low peak $V_{LP}$ by $K_1 \times A$, and the wheel speed Vb is higher than the low peak $V_{LP}$ by $K_2 \times A$. The factors $K_1$ and $K_2$ are preset, and in a typical example, $K_1 \times 100\%$ and $K_2 \times 100\%$ may be selected to be 15% and 80%, respectively.

Assuming that a time $\Delta T$ is taken for the wheel speed to be increased from Va to Vb, the average acceleration $\overline{V}_W$ over the time interval $\Delta T$ is given by $$\overline{V}_W = (Vb - Va/\Delta T) \quad (3)$$

In a pressure buildup time store unit indicated at 65 in FIG. 2, the average acceleration is segmented into several steps, and information is stored which represents pressure buildup times (typically, several ms to several 10 ms) assigned to the respective steps of the segmented average acceleration. The initial pressure buildup time period $T_6$ ($T_P$) is selected according to the average acceleration $\overline{V}_W$, as mentioned later, which is derived from the unit 64 and read out of the store unit 65.

Time $T_6$: In FIGS. 5 and 6, when the wheel speed $V_W$ reaches a high peak $V_{HP}$, a high peak detector 66 provides an output signal "5", which in turn is passed to the store unit 65 so that the pressure buildup time $T_6$ ($T_P$) corresponding to the average acceleration computed in the unit 64 is read out. The polarity of the output signal of the store unit 65 is reversed in an inverter 67 so as to be converted to an output signal "6", which in turn appears at the output of the first OR circuit 56 through a second AND circuit 68. Thus the pressure buildup/holding signal $S_1$ disappears after the time $T_6$ ($T_P$). In this way, during the time $T_6$ ($T_P$), the first valve 2 is opened so that the brake fluid pressure P builds up.

The pressure buildup produced during this time $T_6$ is in a "former" pressure buildup stage.

The wheel deceleration $\dot{V}_W$ occurring immediately before the end of the time $T_6$ is detected by a wheel deceleration detector 71, and a signal resulting from this detection is passed to a fourth and a fifth comparator 72 and 73. In the fourth comparator 72, the signal representing the wheel deceleration $\dot{V}_W$ occurring immediately before the end of the time $T_6$ is compared with preset values "a" to "d", and based on the result of the comparison, in the next circuit 74 the time information stored therein which corresponds to the above-mentioned result of the comparison is read out so that the time during which the first valve remains closed is determined. The output signal "7" of the circuit 74 is passed to a second OR circuit 75, and together with the output signal "6", to the AND circuit 68.

Time $T_7$: During this time period, the signal S1 is caused to appear based on the output signal "7", so that the first valve 2 is closed and the brake fluid pressure P is held.

In the fifth comparator 73 (FIG. 2) the wheel deceleration $\dot{V}_W$, immediately before the end of the time $T_7$, detected by the deceleration detector 71 is compared with preset values "e" to "h". In the next circuit 76, the time information previously stored therein which corresponds to the result of the comparison made by the comparator 73 is read out, so that the time period during which the first valve remains open is determined. The polarity of the output of the circuit 76 is reversed in a second inverter 77, and thus is converted to an output signal "8" which in turn is passed to the second OR circuit 75 along with the output signal "7". The output of the second OR circuit 75 is passed to the second AND circuit 68 along with the output signal "6". The comparison in the comparator 72 is effected when a trigger signal is provided thereto, through a third OR circuit 78, from the unit 65 or a circuit 76 for determining the length of the time during which the first valve remains opened. Further, the comparison in the fifth comparator 73 is effected when a trigger signal is provided thereto from a circuit 74 for determining the length of the time during which the first valve remains closed.

Time $T_8$: The first valve 2 is opened in accordance with an output signal "8" which corresponds to the time determined during the time $T_7$ so that the brake fluid pressure P is caused to build up. Based on the deceleration speed $\dot{V}_W$ occurring immediately before the end of the time $T_8$, the length of the next time $T_7$ is determined during which the first valve remains closed.

As mentioned above, the length of each time in a "latter" pressure buildup stage is determined on the basis of the wheel deceleration occurring immediately before the beginning of each time, and the determination is effected by reading out preset time information, as in the former pressure buildup stage. Of course, the contents of the time information are different between the former pressure buildup stage and the latter pressure buildup stage, and may be suitably determined by taking into consideration experimental and/or empirical results relative to each motor vehicle.

In determining the brake fluid pressure holding time $T_7$ and brake fluid pressure buildup time $T_8$, it is possible that one of the times may be determined on the basis of the wheel deceleration $\dot{V}_W$ occurring immediately before the beginning of that time while the other may be a period of a predetermined constant time length. With such an arrangement, the control procedures are simplified.

Time $T_9$: The repetition of the pressure holding and buildup times in the latter pressure buildup stage is continued until the wheel speed $V_W$ is reduced to become equal to a reference velocity $V_{W0}$, which will be described below in detail, i.e., until the line indicating the wheel speed $V_W$ and the straight line indicating the reference velocity $V_{W0}$ intersect at R. Then, a control similar to that performed during the time $T_4$ is performed during a time $T_9$. In FIG. 5, $T_{10}$ indicates a time corresponding to the pressure decreasing time $T_5$.

The reference velocity $V_{W0}$ is determined in the reference velocity determination unit 54 (FIG. 2), to which a predetermined gradient $\theta$ and a predetermined velocity value $\Delta V$ are input from the average acceleration unit 64. In FIG. 5, the reference velocity $V_{W0}$ is defined as a straight line initiating at a point Q which is positioned under the high peak $V_{HP}$ of the wheel speed $V_W$ by the predetermined value $\Delta V$ and extending straight at the predetermined gradient $\theta$.

Figure 7:
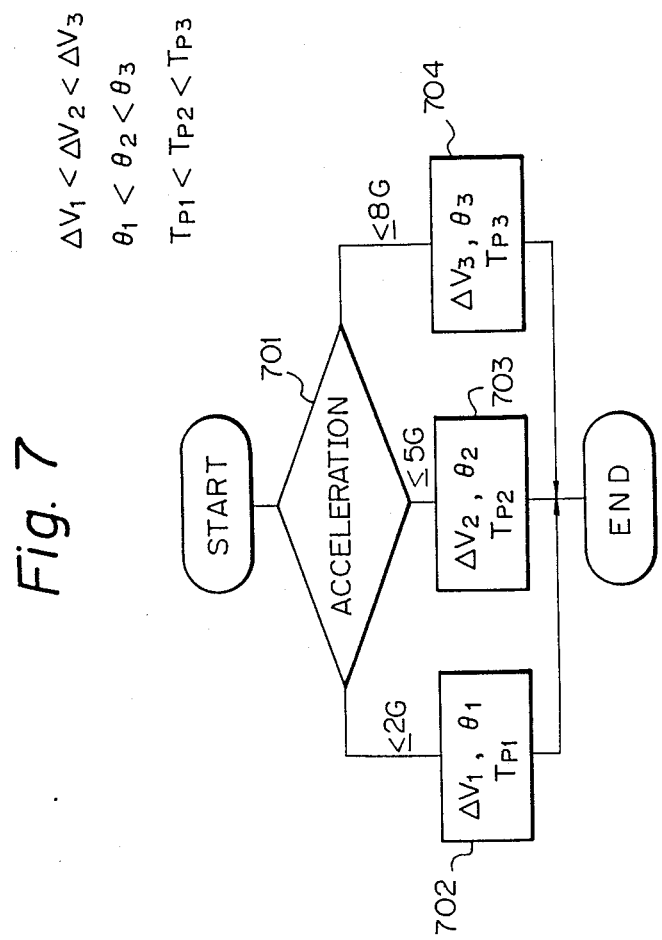
FIG. 7 is a flow diagram for explaining the embodiment shown in FIG. 6.

The process for determining the initial pressure buildup time $T_6$ ($T_P$), the predetermined velocity value $\Delta V$, and the predetermined gradient $\theta$ will be described with reference to FIG. 7. At step 701, the average acceleration $\dot{V}_W$ of the wheel, which has been determined previously according to the equation (3), is discriminated for three stages, for example, for the first stage: not more than 2G (twice the acceleration of gravity); for the second stage: not more than 5G; or for the third stage: not more than 8G.

The initial pressure buildup time $T_6$ ($T_P$), the velocity value $\Delta V$, and the gradient $\theta$ are predetermined for three stages, respectively, as follows:

Velocity value $\Delta V$: $\Delta V_1 < \Delta V_2 < \Delta V_3$
Initial pressure buildup time $T_P$: $P_{P1} < T_{P2} < T_{P3}$
Gradient $\theta$: $\theta_1 < \theta_2 < \theta_3$ If the average acceleration $\dot{V}_W$ is not more than 2G, the operation moves to step 702, in which a predetermined velocity value $\Delta V_1$, a predetermined gradient $\theta_1$, and a predetermined initial pressure buildup time $T_{P1}$ are employed as the velocity value $\Delta V$, the gradient $\theta$, and the initial pressure buildup time $T_P$, respectively. In this case, all these values are the smallest possible. That is, the coefficient of friction $\mu$ between the tire surface and the road surface is so small that the pressure buildup time at this skid-cycle must be set at the smallest value.

If the average acceleration $\dot{V}_W$ is larger than 2G, but not more than 5G, the operation moves to step 703, in which a predetermined velocity value $\Delta V_2$, a predetermined gradient $\theta_2$, and a predetermined initial pressure buildup time $T_{P2}$ are employed as the velocity value $\Delta V$, the gradient $\theta$, and the initial pressure buildup time $T_P$, respectively. In this case, all of these values are intermediate. That is, the coefficient of friction $\mu$ between the tire surface and the road surface is intermediate, so that the pressure buildup time at this skid-cycle is set at the intermediate value.

If the average acceleration $\dot{V}_W$ is larger than 5G, but not more than 8G, the operation moves to step 704, in which a predetermined velocity value $\Delta V_3$, a predetermined gradient $\theta_3$, and a predetermined initial pressure buildup time $T_{P3}$ are employed as the velocity value $\Delta V$, the gradient $\theta$, and the initial pressure buildup time $T_P$, respectively. In this case, all of these values are the largest possible. That is, the coefficient of friction $\mu$ between the tire surface and the road surface is so large that the pressure buildup time at this skid-cycle is set at the largest value.

As mentioned above, the present invention is provided with a reference velocity $V_{W0}$ which has an initial point Q positioned under the high peak $V_{HP}$ of the wheel speed $V_W$ by a predetermined value $\Delta V$ and extending straight at a predetermined gradient $\theta$. In order to perform the braking operation from this high peak point $V_{HP}$ of the wheel speed $V_W$ until the time when the reference velocity $V_{W0}$ intersects the wheel speed $V_W$, the velocity value $\Delta V$, the gradient $\theta$, and the initial pressure buildup time $T_P$ are selected in accordance with the average acceleration $Vb-Va/\Delta V$ of the wheel measured between two points (Va and Vb in FIG. 5) within the time $T_5$, i.e., the acceleration period, in the preceding skid-cycle. This selection of $\Delta V$, $\theta$, and $T_P$ is repeated in each skid-cycle and, therefore, the most appropriate anti-skid control is performed on the basis of the coefficient of friction $\mu$ between the tire surface and the road surface on which the motor vehicle is running. Particularly, even if the conditions of the road surface, such as the coefficient of friction, are changed during a braking operation, wheel lock due to an excess braking pressure and/or an unnecessary extension of the braking distance due to a lack of braking pressure are both prevented, so that a stable operation of the motor vehicle is attained, since the vehicle can be stopped within a minimum braking distance.

We claim:

1. An anti-skid control system for a motor vehicle, including a brake fluid pressure buildup-control mode and a brake fluid pressure reduction mode, which occur in anti-skid cycles, said anti-skid control system comprising:

first valve means for alternately building up and holding brake fluid pressure during said brake fluid pressure buildup-control mode;

wheel speed measuring means for measuring a speed of each wheel of the motor vehicle and for providing a wheel velocity signal $V_W$ responsive to said speed;

peak detecting means for receiving said velocity signal $V_W$ and for detecting a high peak value $V_{HP}$ and a low peak value $V_{LP}$ of said velocity signal $V_W$ when said anti-skid control system is operated;

controller means for repetitively opening and closing said first valve means during said brake fluid pressure buildup-control mode, from a first time when said velocity signal $V_W$ has said high peak value $V_{HP}$ to a second time when said velocity signal $V_W$ has a value R, said value R corresponding to said velocity signal $V_W$ being equal to a reference velocity $V_{WO}$ at the second time, said reference velocity $V_{WO}$ having an initial value at the first time being less than said high peak value $V_{HP}$ by a predetermined velocity value $\Delta V$, having values which vary between the first time and the second time dependent upon a gradient $\theta$, and having a final value equal to said velocity signal $V_W$ at the second time corresponding to said value R;

acceleration measuring means for measuring wheel acceleration during a time after detection of said low peak value $V_{LP}$ by said peak detecting means on the basis of said velocity signal $V_W$ between a first value Va and a second value Vb of said velocity signal $V_W$, said first value Va being dependent upon a predetermined rate of wheel velocity and said low peak value $V_{LP}$, said second value Vb being dependent upon another predetermined rate of wheel velocity and said first value Va; and determining means for determining at least one of said predetermined velocity value $\Delta V$, said gradient $\theta$ and an initial pressure buildup time $T_P$, for said brake fluid pressure buildup-control mode and in accordance with said measured wheel acceleration.

2. An anti-skid control system according to claim 1, wherein said predetermined velocity value $\Delta V$, said gradient $\theta$, and said initial pressure buildup time $T_P$ are determined in accordance with said measured wheel acceleration in a preceding anti-skid cycle.

3. An anti-skid control system according to claim 1, wherein said acceleration determining means includes means for calculating a value $R_O$ corresponding to said value R of a preceding anti-skid cycle, so that said first value Va and said second value Vb of said velocity signal $V_W$ are defined as follows:

$$Va = K_1([V_{WO}]R_O - V_{LP}) + V_{LP}$$

$$Vb = K_2([V_{WO}]R_O - V_{LP}) + V_{LP}$$

where $O < K_1 < K_2$.

4. An anti-skid control system according to claim 3, wherein $K_1 = 0.15$ and $K_2 = 0.8$.

5. An anti-skid control system according to claim 1, further comprising selection means for selecting said predetermined velocity value $\Delta V$, said gradient $\theta$, and said initial pressure buildup time $T_P$ for an anti-skid cycle in accordance with a value of said measured wheel acceleration.

6. An anti-skid control system according to claim 1, wherein said acceleration determining means further includes:

means for determining said first value $V_a$ of said velocity signal $V_W$ in accordance with a first predetermined value of velocity of said low peak value $V_{LP}$; and means for determining said second value $V_b$ of said velocity signal $V_W$ in accordance with a second predetermined value of velocity and said low peak value $V_{LP}$.

7. An anti-skid control system for a motor vehicle, including a brake fluid pressure buildup-control mode and a brake fluid pressure reduction mode, each of which occurs in anti-skid cycles, said anti-skid brake control system comprising:

first valve means for alternately building-up and holding brake fluid pressure during said brake fluid pressure buildup-control mode;

second valve means for reducing brake fluid pressure during said brake fluid pressure reduction mode;

wheel speed measuring means for measuring a speed of each wheel of the motor vehicle and for providing a wheel velocity signal $V_W$ responsive to said speed;

peak detecting means for receiving said velocity signal $V_W$ and for determining a high peak value $V_{HP}$ and a low peak value $V_{LP}$ of said velocity signal $V_W$ when a wheel is braked;

controller means for repetitively opening and closing said first valve means during said brake fluid pressure buildup-control mode, from a first time when said velocity signal $V_W$ has said high peak value $V_{HP}$ to a second time when said velocity signal $V_W$ has a value R, said value R corresponding to said velocity signal $V_W$ being equal to a reference velocity $V_{WO}$ at the second time, said reference velocity $V_{WO}$ having an initial value at the first time being less than said high peak value $V_{HP}$ by a predetermined velocity value $\Delta V$, having values which vary between the first time and the second time dependent upon a gradient, and having a final value equal to said velocity signal $V_W$ at the second time corresponding to said value R;

acceleration measuring means for measuring wheel acceleration during a time after detection of said low peak value $V_{LP}$ by said peak detecting means on the basis of said velocity signal $V_W$ between a first value Va and a second value Vb of said velocity signal $V_W$, said first value Va being dependent upon a predetermined rate of wheel velocity and said low peak value $V_{LP}$, said second value Vb being dependent upon another predetermined rate of wheel velocity and said first value Va;

determining means for determining at least one of said predetermined velocity value $\Delta V$, said gradient $\theta$ and an initial pressure buildup time $T_P$, for said brake fluid pressure buildup-control mode in accordance with said measured wheel acceleration; and reduction control means for controlling opening of said second valve means during said brake fluid pressure reduction mode, from a time corresponding to an occurrence of said value R until a time corresponding to an occurrence of said low peak value $V_{LP}$ of said velocity signal $V_W$.

8. An anti-skid control system according to claim 7, wherein said acceleration determining means further includes:

means for determining said first value $V_a$ of said velocity signal $V_W$ in accordance with a first predetermined value of velocity; and means for determining said second value $V_b$ of said velocity signal $V_W$ in accordance with a second predetermined value of velocity.

* * * * *

UNITED STATES PATENT AND TRADEMARK OFFICE
CERTIFICATE OF CORRECTION

PATENT NO. : 4,825,371
DATED : APRIL 25, 1989
INVENTOR(S) : AKIRA HOASHI ET AL.

It is certified that error appears in the above-identified patent and that said Letters Patent is hereby corrected as shown below:

FRONT PAGE [73] Assignee: delete this section in its entirety and in place thereof, insert the following new section:

--[73] Assignee: Fujitsu Limited, Kawasaki, Japan; Akebono Brake Industry Co., Ltd., Tokyo, Japan--.

FRONT PAGE [57] ABSTRACT,
line 15, "building-control" should be --buildup-control--.

Col. 5, line 67, "$V_w$" should be --$\bar{V}_w$--.

Col. 6, line 6, "$\dot{V}_w$" should be --$\bar{V}_w$--.

Col. 7, line 29, "the unit" should be --the store unit--.

UNITED STATES PATENT AND TRADEMARK OFFICE
CERTIFICATE OF CORRECTION

PATENT NO. : 4,825,371

DATED : APRIL 25, 1989

INVENTOR(S) : AKIRA HOASHI ET AL.

Page 2 of 2

It is certified that error appears in the above-identified patent and that said Letters Patent is hereby corrected as shown below:

Col. 8, line 17, "$\dot{V}_w$" should be --$\bar{V}_w$--;

line 30, "$\dot{V}_w$" should be --$\bar{V}_w$--;

line 40, "$\dot{V}_w$" should be --$\bar{V}_w$--;

line 51, "$\dot{V}_w$" should be --$\bar{V}_w$--.

Col. 10, line 68, "gradient," should be --gradient θ,--.

Signed and Sealed this

Nineteenth Day of December, 1989

Attest:

JEFFREY M. SAMUELS

*Attesting Officer*    *Acting Commissioner of Patents and Trademarks*